UNITED STATES PATENT OFFICE.

PIERRE A. RALLY, OF TUCSON, ARIZONA.

AUTOMOBILE-POLISH.

1,376,228.   Specification of Letters Patent.   Patented Apr. 26, 1921.

No Drawing.   Application filed July 13, 1920. Serial No. 395,921.

*To all whom it may concern:*

Be it known that I, PIERRE A. RALLY, a citizen of the United States, residing at Tucson, in the county of Pima and State of Arizona, have invented certain new and useful Improvements in Automobile-Polish, of which the following is a specification.

This invention relates to an automobile polish.

The object of the invention is to provide a polish of this character which is dust proof and which when applied will greatly enhance the appearance of the car.

The polish constituting this invention is composed of

| | |
|---|---|
| Gum mastic | 6 ounces |
| Lamp black or other coloring | 4 ounces |
| Alcohol | 1 gallon |
| Naphthalene | 6 ounces |

The above described ingredients are thoroughly commingled and provide a polish which is especially applicable to automobiles being thoroughly dust proof that is it will not combine with the dust from the road, the latter being easily removed leaving a polished surface after such removal. While especially designed for automobiles it may be used for polishing other metal surfaces.

While the proportions given are those which have been found to give the best results obviously they may be varied slightly and yet produce a thoroughly efficacious polish.

I claim:

1. A dust proof automobile polish composed of gum mastic, coloring material, naphthalene and alcohol.

2. A polish of the class described composed of gum mastic 6 ounces, lamp black 4 ounces, naphthalene 6 ounces, and 1 gallon of alcohol.

In testimony whereof, I affix my signature hereto.

PIERRE A. RALLY.